US011135966B1

(12) United States Patent
Regenauer et al.

(10) Patent No.: US 11,135,966 B1
(45) Date of Patent: Oct. 5, 2021

(54) FOLDABLE LIGHT ASSEMBLY

(71) Applicant: DEERE & COMPANY, Moline, IL (US)

(72) Inventors: Magdalena J. Regenauer, Denver, IA (US); David L. Stuber, Waterloo, IA (US); Jesse A. Rusch, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/038,706

(22) Filed: Sep. 30, 2020

(51) Int. Cl.
F21V 21/26 (2006.01)
B60Q 1/00 (2006.01)
B60Q 1/24 (2006.01)

(52) U.S. Cl.
CPC .......... B60Q 1/245 (2013.01); B60Q 2200/30 (2013.01); B60Y 2200/221 (2013.01)

(58) Field of Classification Search
CPC ................ B60Q 2200/30; B60Q 1/245; B60Y 2200/221; F21V 21/26
See application file for complete search history.

(56) References Cited

U.S. PATENT DOCUMENTS 3,683,842 A * 8/1972 Logan ...................... B60Q 1/30
362/542
4,413,451 A * 11/1983 Featherstone ........ B60Q 1/2657
277/553
5,572,837 A * 11/1996 Featherstone ............. B60P 3/18
52/118
5,718,087 A * 2/1998 Featherstone ......... E04H 12/182
52/108
6,299,336 B1 * 10/2001 Hulse .................... B60Q 1/2611
362/198
6,546,677 B1 * 4/2003 Featherstone ............ H01Q 1/08
362/384
8,662,720 B2 * 3/2014 Cifers ..................... B63B 45/04
362/450
9,559,410 B2 * 1/2017 Grodahl .................. B60R 11/00
9,764,680 B2 * 9/2017 Tamay ................. B60Q 1/2661
10,377,321 B2 * 8/2019 Yerdon ................ G03B 17/561
10,829,035 B2 * 11/2020 Robertson ................ B60Q 1/24

OTHER PUBLICATIONS

AGCO, Image of Agco LT95A uses a ball dimple in plate.
CASE, Image of Case Quantum uses a tub in slot.

* cited by examiner

Primary Examiner — Arman B Fallahkhair

(57) ABSTRACT

A foldable light assembly includes a first elongated component rotatably connected to a second elongated component between a use position and a folded position. A light is attached to either the first or the second elongated components. The first elongated component includes an external surface having a first portion with a first profile and a second portion with a second profile, in which the first profile has less curvature than the second profile. The second elongated component includes a first extending member and a second extending member each with an internal surface having a third portion with a third profile and a fourth portion with a fourth profile, in which the fourth profile has less curvature than the third profile. In the use position, the third profiles are contiguous with the second profile. In the folded position, the fourth profiles are contiguous with the first profile.

14 Claims, 6 Drawing Sheets

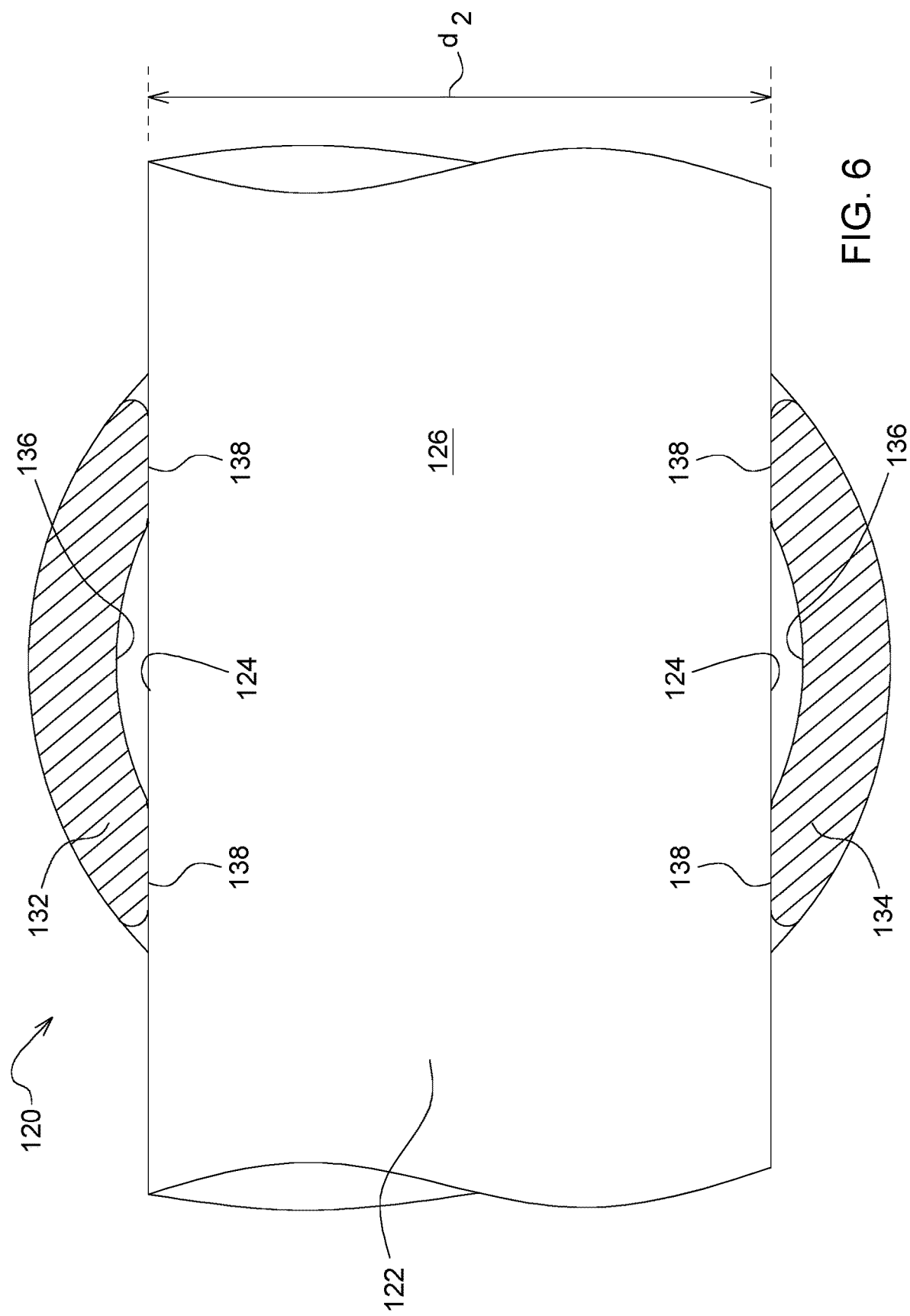

FOLDABLE LIGHT ASSEMBLY

CROSS-REFERENCE TO RELATED APPLICATIONS

N/A

FIELD OF THE DISCLOSURE

The present disclosure relates to a foldable light assembly for a work vehicle.

BACKGROUND

Work vehicles can include a flashing light or beacon mounted to a work vehicle with a folding post.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a folding support for a light or beacon.

According to an aspect of the present disclosure, a foldable light assembly includes a first elongated component foldably connected to a second elongated component about a transverse axis between a use position and a folded position. A light is attached to either the first or the second elongated component. The first elongated component includes an external surface having a first portion with a first profile and a second portion with a second profile, in which the first profile has less curvature than the second profile. The second elongated component includes a first extending member and a second extending member each with an internal surface having a third portion with a third profile and a fourth portion with a fourth profile, in which the fourth profile has less curvature than the third profile. In the use position, the third profiles of the third portions of the first and second extending members are contiguous with the second profile of the second portion of the first elongated component. In the folded position, the fourth profiles of the fourth portions of the first and second extending members are contiguous with the first profile of the first portion of the first elongated component.

According to an aspect of the present disclosure, the third profiles of the third portions of the first and second extending members are counterparts to the second profile of the second portion of the first elongated component, and the fourth profiles of the fourth portions of the first and second extending members are counterparts to the first profile of the first portion of the first elongated component.

According to an aspect of the present disclosure, the first and second extending members are spaced apart a first distance along the transverse axis in the use position and are spaced apart a second distance along the transverse axis in the folded position, in which the second distance is greater than the first distance.

According to an aspect of the present disclosure, the folded position includes first and second folded positions located in opposite directions.

According to an aspect of the present disclosure, the first and second extending members each include a plurality of fourth portions with the third portion located between the plurality of fourth portions.

According to an aspect of the present disclosure, the first elongated component includes alternating first and second portions.

According to an aspect of the present disclosure, at least one of the first and second extending members provides a biasing force to move the first and second extending members towards each other when transitioning from the folded position to the use position and to allow the first and second extending members to move away from each other when transitioning from the use position to the folded position.

According to an aspect of the present disclosure, the biasing force of at least one of the first and second extending members is adjustable.

According to an aspect of the present disclosure, a fastening component rotatably connects the first and second elongated components.

According to an aspect of the present disclosure, the fastening component includes a central axis defining the transverse axis.

According to an aspect of the present disclosure, the first elongated component includes a first bore extending therethrough, and each of the first extending member and the second extending member of the second elongated component includes a second bore extending therethrough, with the fastening component slideably disposed within the first bore of the first elongated component and the second bores of the first and second extending members of the second elongated component.

According to an aspect of the present disclosure, a resilient member provides a biasing force to move the first and second extending members towards each other when transitioning from the folded position to the use position and to allow the first and second extending members to move away from each other when transitioning from the use position to the folded position.

According to an aspect of the present disclosure, the resilient member includes a coil spring concentric with the fastening component and secured to the fastening component.

According to an aspect of the present disclosure, the biasing force of the resilient member is adjustable.

According to an aspect of the present disclosure, either the first elongated component or the second elongated component is attached to an associated work vehicle.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 6 is a cross-sectional view of the foldable light assembly in the folded position shown in FIG. 3, according to an implementation.

Like reference numerals are used to indicate like elements throughout the several figures.

DETAILED DESCRIPTION

The implementations disclosed in the above drawings and the following detailed description are not intended to be exhaustive or to limit the disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally", "substantially" or "approximately" are understood by those having ordinary skill in the art to refer to reasonable ranges outside of a given value or orientation, for example, general tolerances or positional relationships associated with manufacturing, assembly, and use of the described implementations.

Figure 1:
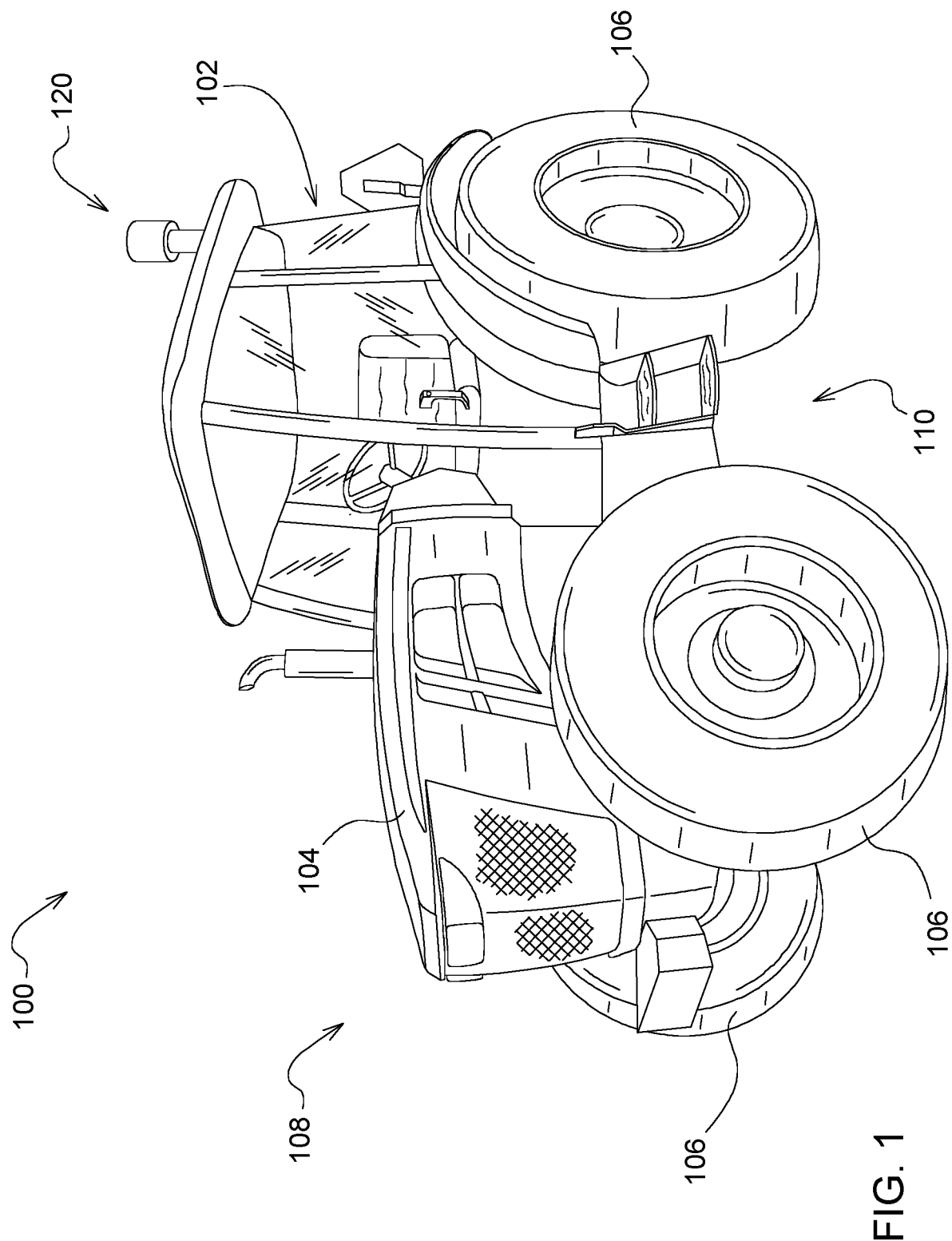
FIG. 1 is a perspective view of a work vehicle including a foldable light assembly, according to an implementation.

FIG. 1 illustrates an agricultural work vehicle 100, for example an agricultural tractor. This disclosure also applies to other types of work vehicles including, but not limited to, agriculture, construction, forestry, transportation, and road building vehicles. The agricultural work vehicle 100, hereinafter referred to as a work vehicle 100, can include a frame or chassis 110, an open operator station or an enclosed operator station or cab 102, and one or more ground engaging apparatus 106, for example wheels or track assemblies. The work vehicle 100 can have a rigid frame 110 or an articulated frame 110. The work vehicle 100 can include a power source 108 positioned under a covering or hood 104 and a transmission transferring power to the ground engaging apparatus 106, hereinafter referred to as wheels 106, and one or more power take off shafts. The work vehicle 100 can include an operator interface having any number and combination of electronic devices, such as an interactive display. The work vehicle 100 can include a foldable light assembly 120.

Figure 2:
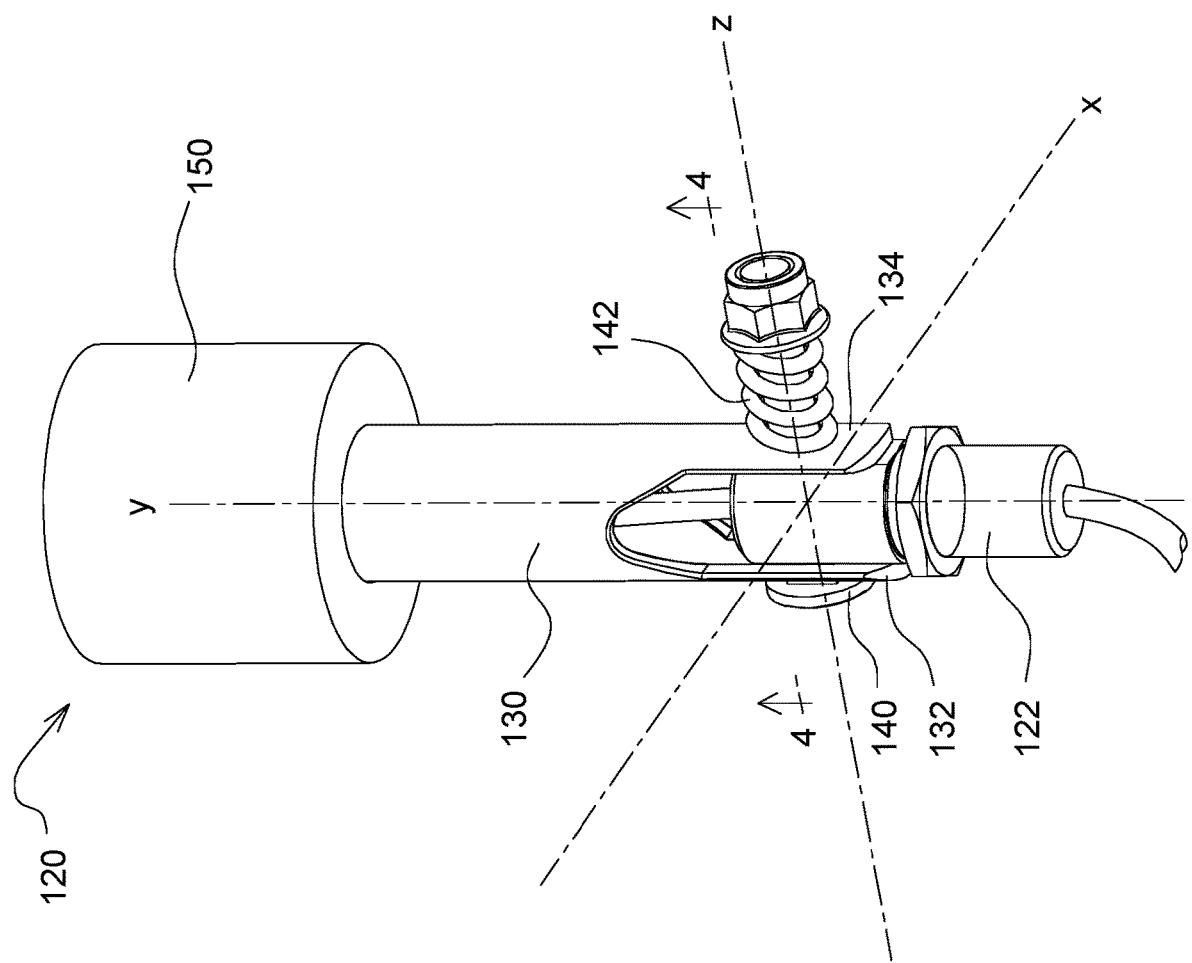
FIG. 2 is a perspective view of a foldable light assembly in a use position, according to an implementation.
Figure 3:
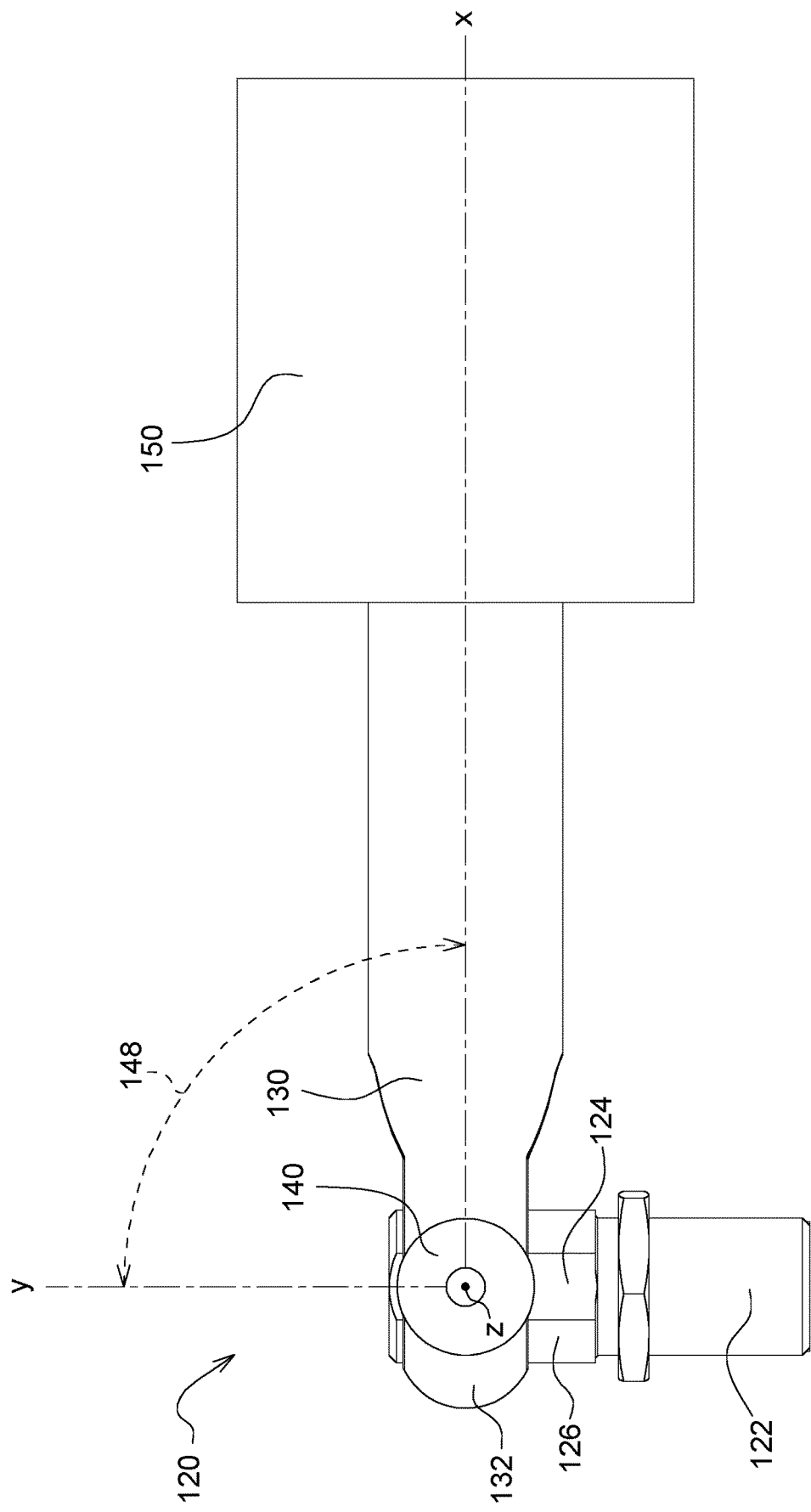
FIG. 3 is a perspective view of a foldable light assembly in a folded position, according to an implementation.
Figure 4:
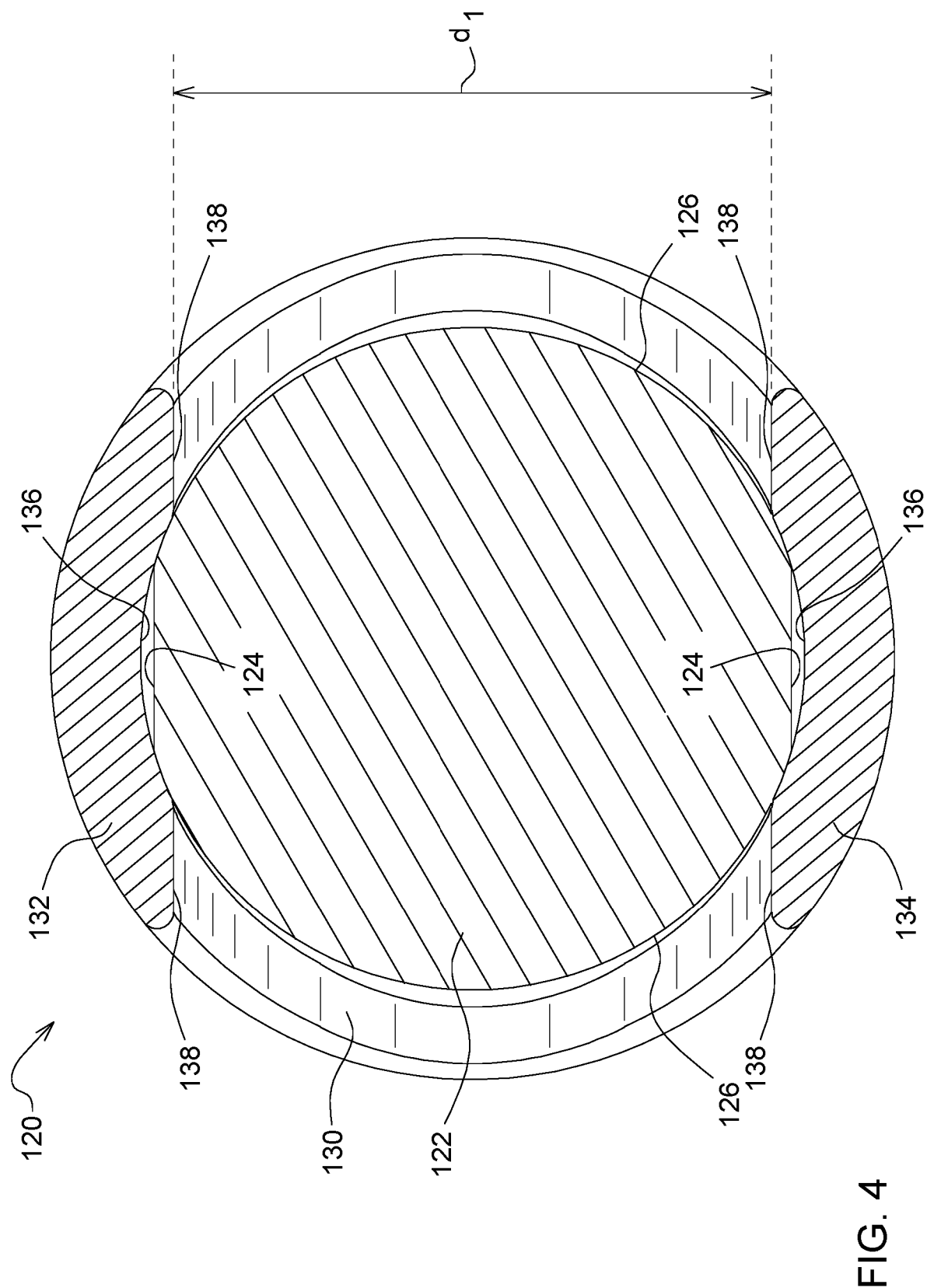
FIG. 4 is a cross-sectional view of the foldable light assembly in the use position shown in FIG. 2, according to an implementation.
Figure 5:
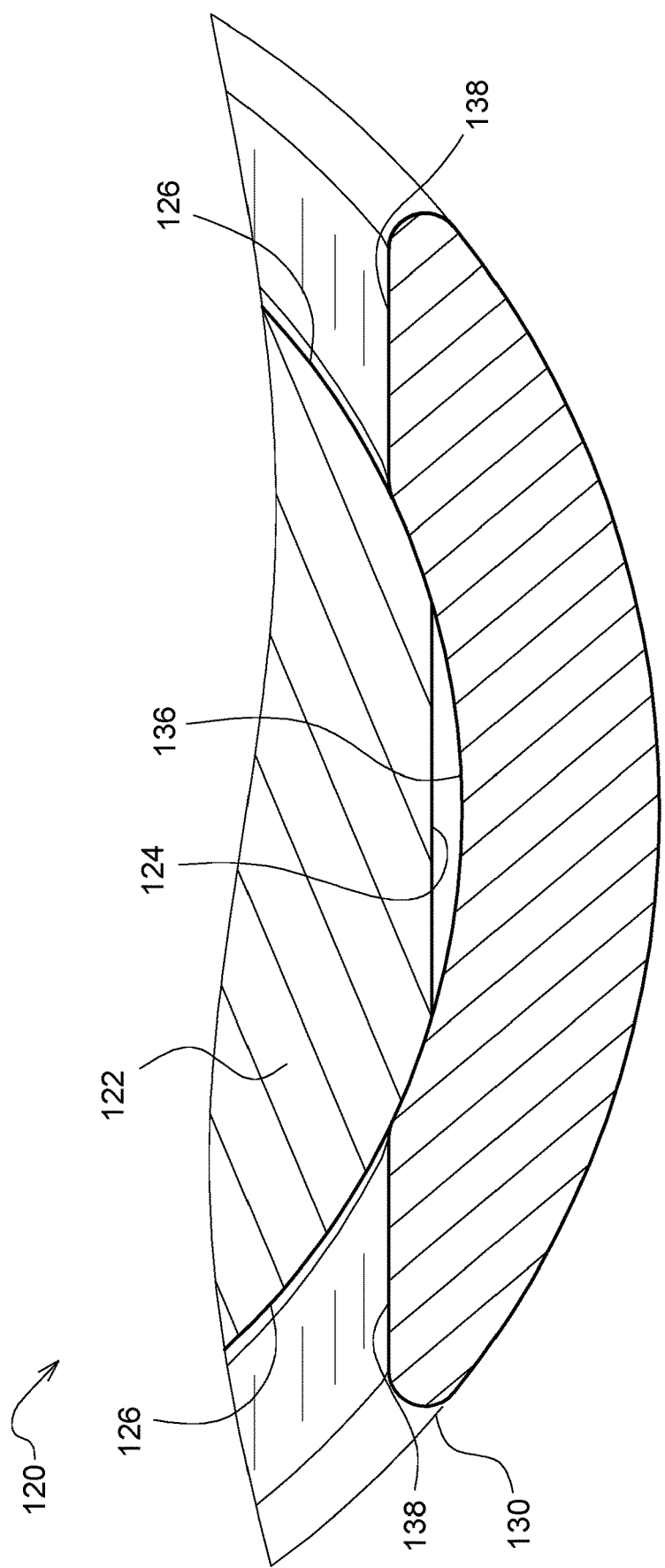
FIG. 5 is a detail view of the foldable light assembly shown in FIG. 4, according to an implementation.

With reference to FIGS. 2 and 3, a foldable light assembly 120 can include a first elongated component 122 rotatably or pivotally connected to a second elongated component 130. A fastening member 140 can rotatably or pivotally connect the first and second elongated components 122, 130. A resilient member 142 can be included with the fastening member 140. A light 150 can be attached to either the first or second elongated component 122, 130. FIG. 2 depicts a use position of the foldable light assembly 120 in which the first and second components 122, 130 are aligned in straight line or are offset at a first angle relative to each other. FIG. 3 depicts a folded position of the foldable light assembly 120 in which the first and second components 122, 130 are at a second angle 148 relative to each other which is larger than the first angle when the foldable light assembly 120 is in the use position.

With reference to FIGS. 3-6, the first elongated component 122 includes an external surface having a first portion 124 with a first profile and a second portion 126 with a second profile. The first profile has less curvature (e.g., a larger radius) or is more level or linear than the second profile. The second elongated component 130 includes a first extending member 132 and a second extending member 134 each with an internal surface having a third portion 136 with a third profile and a fourth portion 138 with a fourth profile. The fourth profile has less curvature (e.g., a larger radius) or is more level or linear and the third profile.

According to some embodiments, the first portion 124 has a first radius of curvature and the second portion 126 has a second radius of curvature. The first radius of curvature of the first portion 124 is larger than the second radius of curvature of the second portion 126. In some embodiments, the first portion 124 has a level or planar surface. The second elongated component 130 includes first and second extending members 132, 134 each having an internal surface including a third portion 136 with a third radius of curvature and a fourth portion 138 with a fourth radius of curvature. The fourth radius of curvature of the fourth portions 138 is larger than the third radius of curvature of the third portions 136. In some embodiments, the fourth portions 138 have a level or planar surface.

According to some embodiments, the third profile of the third portion 136 is a counterpart or complement of the second profile of the second portion 126 and the fourth profile of the fourth portion 138 is a counterpart or complement of the first profile of the first portion 124. According to some embodiments, the second and third profiles are mirror images of each other and the first and fourth profiles are mirror images of each other.

According to some embodiments, the first portion 124 has a planar surface and the second portion 126 has a radius of curvature. The second elongated component 130 includes first and second extending members 132, 134 each having an internal surface including a third portion 136 with a radius of curvature and a fourth portion 138 with a planar surface.

The second elongated component 130 is rotatably connected to the first elongated component 122 about a transverse axis Z between a use position in which the third profiles of the third portions 136 of the first and second extending members 132, 134 are contiguous with the second profile of the second portion 126 of the first elongated component 122 and a folded position in which the fourth profiles of the fourth portions 138 of the first and second extending members 132, 134 are contiguous with the first profile of the first portion 124 of the first elongated component 122. The second and third profiles can form an adjoining surface in the use position and the first and fourth profiles form an adjoining surface in the folded position. The first and second extending members 132, 134 are spaced apart a first distance $d_1$ along the transverse axis Z in the use position and are spaced apart a second distance $d_2$ along the transverse axis Z in the folded position. The second distance $d_2$ is greater than the first distance $d_1$. The first and second extending members 132, 134 can be elastic or resilient. The first and second extending members 132, 134 can be biased to maintain the first distance $d_1$ in the use position such that when the first and second extending members 132, 134 are further separated to the second distance $d_2$ in the folded position, the first and second extending member 132, 134 exert a spring or biasing force to return to the first distance $d_1$.

The folded position can include first and second folded positions located in opposite directions. The first and second extending members 132, 134 can each include a plurality of fourth portions 138 with the third portion 136 located between the plurality of fourth portions 138. The first elongated component 122 can include alternating first and second portions 124, 126.

The foldable light assembly 120 can include a fastening component 140 rotatably connecting the first and second elongated components 122, 130. The foldable light assembly can include a resilient member 142 providing a biasing force to move the first and second extending members 132, 134 towards each other when transitioning from the folded position to the use position and to allow the first and second extending members 132, 134 to move away from each other when transitioning from the use position to the folded position. The fastening component 140 can include a central axis defining the transverse axis Z. The resilient member 142 can include, but is not limited to, a coil spring concentric with the fastening component 140 and secured to the fastening component 140.

The first elongated component 122 can include a first bore extending therethrough. Each of the first extending member 132 and the second extending member 134 of the second elongated component 130 can include a second bore extending therethrough. The fastening component 140 can be slidably inserted within and extracted from the first bore of the first elongated component 122 and the second bores of the first and second extending members 132, 134 of the second elongated component 130. Either one of the first and second elongated components 122, 130 can be attached to an associated work vehicle 100.

When the foldable light assembly 120 is in the use position, both the first and second extending members 132, 134 and the resilient member 142 can exert a spring or biasing force to maintain the first and second extending members 132, 134 at the first distance $d_1$. When the foldable light assembly 120 is in the folded position, both the first and second extending members 132, 134 and the resilient member 142 can exert a spring or biasing force return the first and second extending members 132, 134 to the first distance $d_1$ from the second distance dz. According to some embodiments, the biasing force of the first and second members 132, 134 can be adjusted by changing the thickness, length, material, or any combination of these elements. According to some embodiments, the biasing force of the resilient member 142 can be adjusted by tightening or loosening the fastener 140, which compresses or expands the resilient member 142. The fastener 140 can include a bolt and a nut and the resilient member 142 can be adjusted by tightening or loosening the nut.

Without in any way limiting the scope, interpretation, or application of the claims appearing below, a technical effect of one or more of the example implementations disclosed herein is a foldable light assembly for a work vehicle. The foldable light assembly can fold or bend between a use position and a folded position. The foldable light assembly is biased to remain in the use position. The foldable light assembly is biased to return to the use position from the folded position.

The terminology used herein is for describing particular implementations and is not intended to be limiting of the disclosure. As used herein, the singular forms "a," "an," and "the" are intended to include the plural forms as well, unless the context clearly indicates otherwise. It will be further understood that the use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A foldable light assembly comprising:
 a first elongated component including an external surface having a first portion with a first profile and a second portion with a second profile, the first profile having less curvature than the second profile;
 a second elongated component including a first extending member and a second extending member each with an internal surface having a third portion with a third profile and a fourth portion with a fourth profile, the fourth profile having less curvature than the third profile;
 a light attached to one of the first and second elongated components;
 wherein the second elongated component is connected via a fastening component to the first elongated component to be rotatable about a transverse axis between a use position, in which the third profiles of the third portions of the first and second extending members are contiguous with the second profile of the second portion of the first elongated component, and a folded position, in which the fourth profiles of the fourth portions of the first and second extending members are contiguous with the first profile of the first portion of the first elongated component,
 wherein the fastening component is slideably disposed within the first elongated component; and
 wherein the third profiles of the third portions of the first and second extending members are a counterpart of the second profile of the second portion of the first elongated member, and the fourth profiles of the fourth portions of the first and second extending members are a counterpart of the first profile of the first portion of the first elongated member.

2. The foldable light assembly of claim 1, further comprising: the fastening component rotatably connecting the first and second elongated components.

3. The foldable light assembly of claim 2, further comprising:
 a resilient member providing a biasing force to move the first and second extending members towards each other when transitioning from the folded position to the use position and to allow the first and second extending members to move away from each other when transitioning from the use position to the folded position.

4. The foldable light assembly of claim 3, wherein the resilient member includes a coil spring concentric with the fastening component and secured to the fastening component.

5. The foldable light assembly of claim 3, wherein the biasing force of resilient member is adjustable.

6. The foldable light assembly of claim 2, wherein the fastening component includes a central axis defining the transverse axis.

7. The foldable light assembly of claim 2, wherein the first elongated component includes a first bore extending therethrough, and each of the first extending member and the second extending member of the second elongated component includes a second bore extending therethrough, with the fastening component slideably disposed within the first bore of the first elongated component and the second bores of the first and second extending members of the second elongated component.

8. The foldable light assembly of claim 1, wherein at least one of the first and second extending members provides a biasing force to move the first and second extending members towards each other when transitioning from the folded position to the use position and to allow the first and second extending members to move away from each other when transitioning from the use position to the folded position.

9. The foldable light assembly of claim 8, wherein the biasing force of the at least one of the first and second extending members is adjustable.

10. The foldable light assembly of claim 1, wherein the first and second extending members are spaced apart a first distance along the transverse axis in the use position and are spaced apart a second distance along the transverse axis in the folded position, the second distance being greater than the first distance.

11. The foldable light assembly of claim 1, wherein the folded position includes first and second folded positions located in opposite directions.

12. The foldable light assembly of claim 1, wherein the first and second extending members each include a plurality of fourth portions with the third portion located between the plurality of fourth portions.

13. The foldable light assembly of claim 1, wherein the first elongated component includes alternating first and second portions.

14. The foldable light assembly of claim 1, wherein one of the first and second elongated components is attached to an associated work vehicle.

* * * * *